(12) United States Patent
Chun et al.

(10) Patent No.: US 12,191,533 B2
(45) Date of Patent: Jan. 7, 2025

(54) SECONDARY BATTERY

(71) Applicant: Samsung SDI Co., Ltd., Yongin-si (KR)

(72) Inventors: Byoung Min Chun, Yongin-si (KR); Gun Gue Park, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 381 days.

(21) Appl. No.: 17/628,874

(22) PCT Filed: Jun. 29, 2020

(86) PCT No.: PCT/KR2020/008485
§ 371 (c)(1),
(2) Date: Jan. 20, 2022

(87) PCT Pub. No.: WO2021/020743
PCT Pub. Date: Feb. 4, 2021

(65) Prior Publication Data
US 2022/0255204 A1      Aug. 11, 2022

(30) Foreign Application Priority Data
Jul. 26, 2019 (KR) .................. 10-2019-0090710

(51) Int. Cl.
*H01M 50/586* (2021.01)
*H01M 10/04* (2006.01)
(Continued)

(52) U.S. Cl.
CPC ..... *H01M 50/586* (2021.01); *H01M 10/0422* (2013.01); *H01M 10/0431* (2013.01);
(Continued)

(58) Field of Classification Search
CPC .... H01M 50/20; H01M 50/10; H01M 50/586; H01M 50/593; H01M 50/107
See application file for complete search history.

(56) References Cited

U.S. PATENT DOCUMENTS 7,629,076 B2    12/2009   Miyahisa et al.
10,224,533 B2    3/2019   Imanishi et al.
(Continued)

FOREIGN PATENT DOCUMENTS

JP    2002-141099 A    5/2002
JP    2004-63231 A     2/2004
(Continued)

OTHER PUBLICATIONS

Machine Translation of: JP 2004-139777 A, Arai et al., May 14, 2004.*
(Continued)

*Primary Examiner* — Kenneth J Douyette
(74) *Attorney, Agent, or Firm* — Lewis Roca Rothgerber Christie LLP (57) ABSTRACT

The present invention relates to a secondary battery and, in order to resolve a technical problem, provides a secondary battery, which blocks a leakage welding current when welding a current collecting plate to a can by coupling an insulating plate to the current collecting plate, and thus increases the welding strength between the current collecting plate and the can, improves welding strength distribution, and prevents damage between the current collecting plate and the can. To this end, disclosed is a secondary battery comprising: a cylindrical can having an opening; an electrode assembly which is accommodated in the opening of the cylindrical can and which is wound in a cylinder shape; a cap assembly which is electrically connected to the electrode assembly and which seals the cylindrical can; a current collecting plate for electrically connecting the elec- (Continued)

trode assembly with the cylindrical can; and an insulating plate inserted between the current collecting plate and the cylindrical can.

8 Claims, 8 Drawing Sheets

(51) Int. Cl.
    *H01M 50/147*     (2021.01)
    *H01M 50/179*     (2021.01)
    *H01M 50/183*     (2021.01)
    *H01M 50/593*     (2021.01)

(52) U.S. Cl.
    CPC ....... *H01M 50/147* (2021.01); *H01M 50/179* (2021.01); *H01M 50/183* (2021.01); *H01M 50/593* (2021.01)

(56) References Cited

U.S. PATENT DOCUMENTS

| | | | |
|---|---|---|---|
| 2005/0048365 A1* | 3/2005 | Miyahisa | H01M 50/566 29/623.2 |
| 2005/0147878 A1 | 7/2005 | Miyahisa et al. | |
| 2007/0141449 A1 | 6/2007 | Kim | |
| 2008/0160401 A1 | 7/2008 | Miyahisa et al. | |
| 2009/0011329 A1 | 1/2009 | Yoon | |
| 2013/0059184 A1* | 3/2013 | Sasakawa | H01M 4/661 429/94 |
| 2015/0243960 A1 | 8/2015 | Imanishi et al. | |
| 2020/0235369 A1 | 7/2020 | Jeong et al. | |

FOREIGN PATENT DOCUMENTS

| | | |
|---|---|---|
| JP | 2004-139777 A | 5/2004 |
| JP | 2005-150073 A | 6/2005 |
| JP | 4293066 B2 | 7/2009 |
| JP | 2014-86319 A | 5/2014 |
| KR | 10-0717802 B1 | 5/2007 |
| KR | 10-2009-0003702 A | 1/2009 |
| KR | 10-2019-0040699 A | 4/2019 |

OTHER PUBLICATIONS

International Search Report for corresponding International Application No. PCT/KR2020/008485, dated Oct. 12, 2020 (6 pages).

* cited by examiner

SECONDARY BATTERY

CROSS-REFERENCE TO RELATED APPLICATION(S)

This application is a U.S. National Phase Patent Application of International Application Number PCT/KR2020/008485, filed on Jun. 29, 2020, which claims priority of Korean Patent Application Number 10-2019-0090710, filed on Jul. 26, 2019, the entire content of each of which is incorporated herein by reference.

TECHNICAL FIELD

The present invention relates to a secondary battery.

BACKGROUND ART

Lithium ion secondary batteries are used, for example, as power sources for hybrid or electric vehicles as well as portable electronic devices because of their advantages of a high operating voltage and a high energy density per unit weight.

Such secondary batteries may be classified into cylindrical, prismatic, and pouch-type secondary batteries in shape. Among them, a cylindrical secondary battery generally includes a cylindrical electrode assembly, a cylindrical can to which the electrode assembly is coupled, an electrolyte injected into the inside of the can to enable movement of lithium ions, and a cap assembly coupled to one side of the can to prevent the electrolyte from leaking and preventing the electrode assembly from being separated.

The above-described information disclosed in the technology that serves as the background of the present invention is only for improving understanding of the background of the present invention and thus may include information that does not constitute the related art.

DISCLOSURE OF THE INVENTION

Technical Problem

The present invention provides a secondary battery, in which an insulating plate is coupled to a current collecting plate to block leaking welding current when the current collecting plate is welded to a can, thereby improving welding strength between the current collecting plate and the can, improving welding strength distribution, and preventing damage between the current collecting plate and the can from occurring.

Technical Solution

An exemplary secondary battery may include: a cylindrical can having an opening; an electrode assembly which is accommodated in the opening of the cylindrical can and wound in a cylinder shape; a cap assembly which is electrically connected to the electrode assembly and seals the cylindrical can; a current collecting plate configured to electrically connect the electrode assembly to the cylindrical can; and an insulating plate interposed between the current collecting plate and the cylindrical can.

The current collecting plate may include a current collecting flat portion that is electrically connected to the electrode assembly and a protrusion protruding from a center of the current collecting flat portion toward the cylindrical can, and the insulating plate may include an insulating flat portion interposed between the current collecting flat portion and the cylindrical can and a through-hole to which the protrusion is coupled.

The protrusion of the current collecting plate may include at least one opening, and in the insulating plate, an inner diameter surface of the through-hole may be coupled to the opening.

The protrusion may include an inclined surface extending from the current collecting flat portion and a central flat portion extending from the inclined surface, wherein the opening may be formed on the inclined surface.

The central flat portion may include a side protrusion protruding toward the opening.

The central flat portion may include a plurality of embossments welded to the cylindrical can.

An inner diameter of the through-hole may be less than an outer diameter of the protrusion.

The insulating plate may include at least one slit formed in a diameter direction from the through-hole.

The insulating plate may include a circumferential portion that wraps a circumference of the current collecting plate.

The current collecting plate may include copper or nickel, and the insulating plate may include one kind or two or more kinds of materials selected from the group consisting of polypropylene (PP), polyethylene (PE), polyimide (PI), polybutylene terephthalate (PET), polycarbonate (PC), or polystyrene (PS).

Advantageous Effects

The present invention may provide the secondary battery, in which the insulating plate is coupled to the current collecting plate to block the leaking welding current when the current collecting plate is welded to the can, thereby improving the welding strength between the current collecting plate and the can, improving the welding strength distribution, and preventing the damage between the current collecting plate and the can from occurring.

MODE FOR CARRYING OUT THE INVENTION

Hereinafter, preferred embodiments will be described in detail with reference to the accompanying drawings.

The present invention may, however, be embodied in many different forms and should not be construed as being limited to the embodiments set forth herein; rather, these embodiments are provided so that those skilled in the art thoroughly understand the present invention. Rather, these embodiments are provided so that this disclosure will be thorough and complete, and will fully convey the scope of the present invention to those skilled in the art.

Also, in the drawing figures, the dimensions of layers and regions may be exaggerated for clarity of illustration. Like reference numerals refer to like elements throughout. As used herein, the term "and/or" may include any and all combinations of one or more of the associated listed items. In this specification, it will also be understood that when a member A is referred to as being connected to a member B, the member A can be directly connected to the member B or indirectly connected to the member B with a member B therebetween.

The terms used herein are for illustrative purposes of the present invention only and should not be construed to limit the meaning or the scope of the present invention. As used in this specification, a singular form may, unless definitely indicating a particular case in terms of the context, include a plural form. Also, the expressions "comprise/include" and/or "comprising/including" used in this specification neither define the mentioned shapes, numbers, steps, operations, members, elements, and/or groups of these, nor exclude the presence or addition of one or more other different shapes, numbers, steps, operations, members, elements, and/or groups of these, or addition of these. The term "and/or" used herein includes any and all combinations of one or more of the associated listed items.

As used herein, terms such as "first," "second," etc. are used to describe various members, components, regions, layers, and/or portions. However, it is obvious that the members, components, regions, layers, and/or portions should not be defined by these terms. The terms do not mean a particular order, up and down, or superiority, and are used only for distinguishing one member, component, region, layer, or portion from another member, component, region, layer, or portion. Thus, a first member, component, region, layer, or portion which will be described may also refer to a second member, component, region, layer, or portion, without departing from the teaching of the present invention.

Spatially relative terms, such as "below", "beneath", "lower", "above", "upper" and the like, may be used herein for ease of description to describe one element or feature's relationship to another element(s) or feature(s) as illustrated in the figures. These spatially relative terms are intended for easy comprehension of the prevent invention according to various process states or usage states of the prevent invention, and thus, the present invention is not limited thereto. For example, an element or feature shown in the drawings is turned inside out, the element or feature described as "beneath" or "below" may change into "above" or "upper". Thus, the term "lower" may encompass the term "upper" or "below".

Figure 1A:
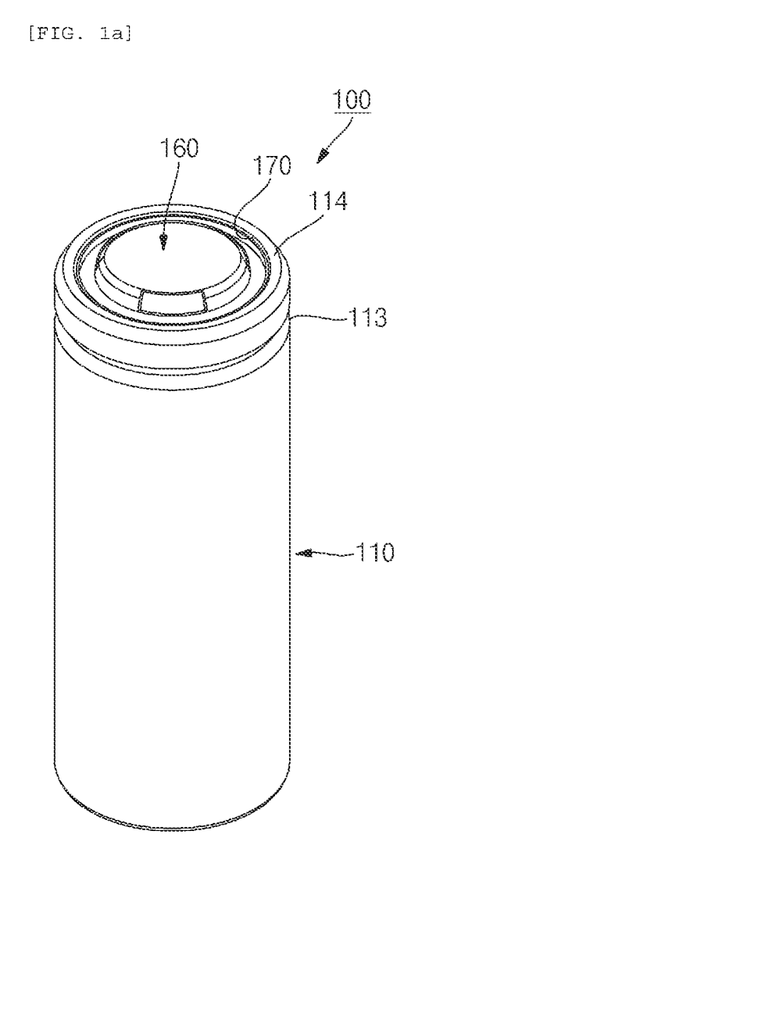
FIGS. 1a and 1b are cross-sectional views illustrating an exemplary secondary battery.
Figure 1B:
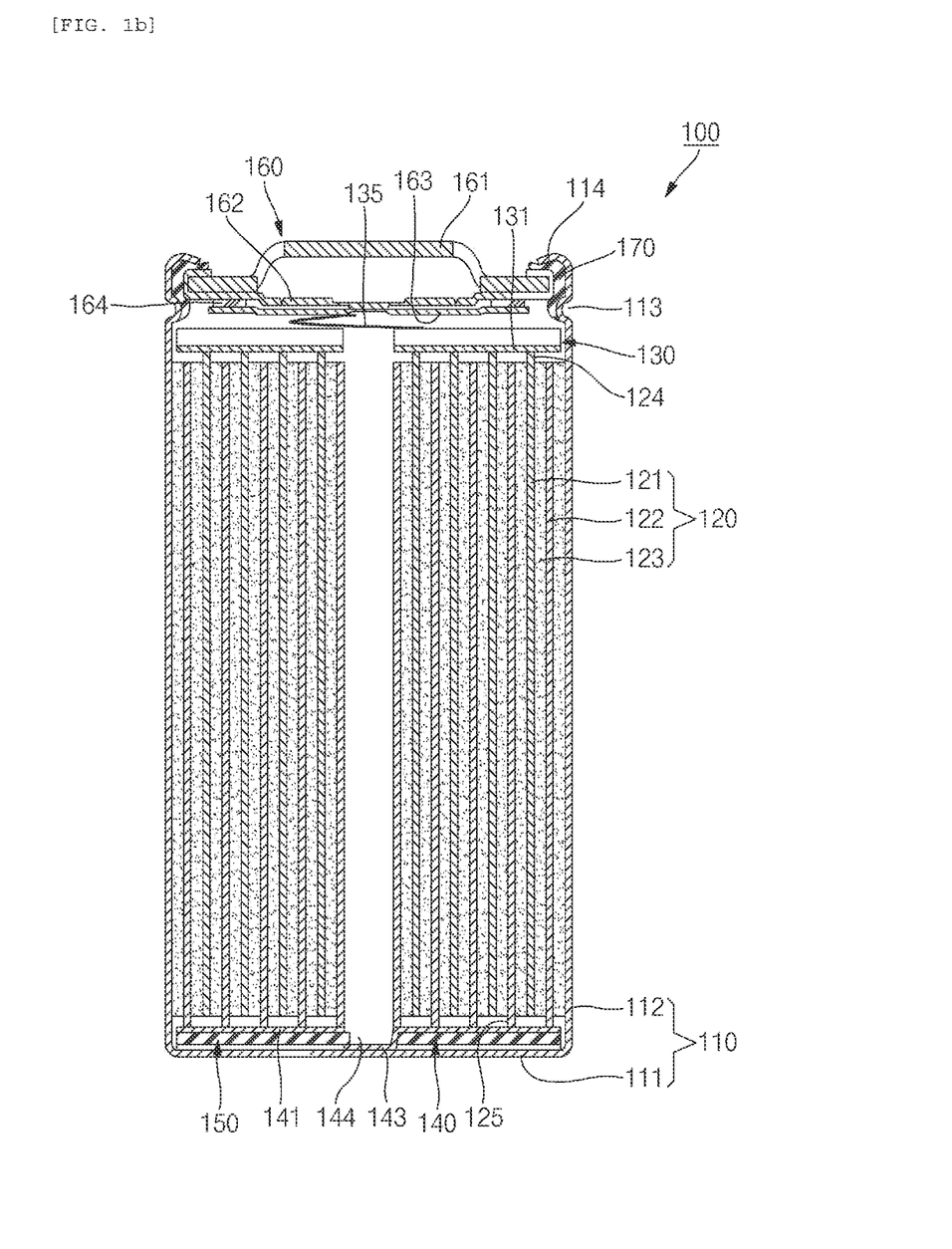

FIGS. 1a and 1b are cross-sectional views illustrating an exemplary secondary battery 100. In an example illustrated in FIGS. 1a and 1b, the exemplary secondary battery 100 may include a cylindrical can 110, a cylindrical electrode assembly 120, a first current collecting plate 130, a second current collecting plate 140, an insulating plate 150, and a cap assembly 160. In addition, the secondary battery 100 may further include an insulating gasket 170 that insulates the cylindrical can 110 from the cap assembly 160.

The cylindrical can 110 includes an approximately circular bottom part 111 and a side part 112 extending by a predetermined length upward from the bottom part 111. During a process of manufacturing the secondary battery 100, an upper portion of the cylindrical can 110 may be opened. Thus, during a process of assembling the secondary battery 100, the electrode assembly 120, the first current collecting plate 130, the second current collecting plate 140, and the insulating plate 150 may be integrated into one structure and be into the cylindrical can 110. Of course, thereafter, the electrolyte may be additionally injected into the cylindrical can 110. In some examples, the cylindrical can 110 may include or be referred to as a case, a housing, or an exterior.

The cylindrical can 110 may include steel, a steel alloy, nickel-plated steel, a nickel-plated steel alloy, aluminum, an aluminum alloy, or an equivalent thereof. In addition, the cylindrical can 110 may include a beading part 113 recessed inward at a lower portion thereof and a crimping part 114 bent inward at an upper portion thereof with respect to the cap assembly 160 to prevent the cap assembly 160 from being separated to the outside.

The cylindrical electrode assembly 120 may be accommodated in the cylindrical can 110. The electrode assembly 120 may include a first electrode plate 121 coated with a first electrode active material (e.g., a positive electrode active material such as transition metal oxide ($LiCoO_2$, $LiNiO_2$, $LiMn_2O_4$, etc.), a second electrode plate 122 coated with a second electrode active material (e.g., a negative electrode active material such as graphite, carbon, silicon, etc.), a separator 123 disposed between the first electrode plate 121 and the second electrode plate 122 to prevent electrical short circuit from occurring between the first electrode plate 121 and the second electrode plate 122 and allow only lithium ions to be movable. The first electrode plate 121, the second electrode plate 122, and the separator 123 may be wound in a substantially cylindrical shape in a stacked state. Here, for example, although not limited thereto, the first electrode plate 121 may include aluminum (Al) foil, and the second electrode plate 122 may include copper (Cu) or nickel (Ni) foil. In addition, although not limited thereto, the separator 123 may include, for example, a polyethylene separator (PES), a polypropylene separator (PPS), a ceramic coated separator (CCS), a polymer coated separator (PCS), a multi-layer coated separator (MCS) or a multi functional separator (MFS), and the like. In some examples, the electrode assembly 120 may include or be referred to as an electrode group or a jelly roll.

A first non-coating portion 124 which protrudes and extends upward by a predetermined length without applying the first electrode active material may be provided on the first electrode plate 121, and a second non-coating portion 125 which protrudes or extends downward by a predetermined length without applying the second electrode active material may be provided on the second electrode plate 122. Here, the protruding and extending directions of the first non-coating portion 124 and the second non-coating portion 125 may be the same as a longitudinal direction of the cylindrical can 110 and/or the cylindrical electrode assembly 120. When the protruding and extending direction of the first non-coating portion 124 is defined as a first direction, the protruding and extending direction of the second non-coating portion 125 may be defined as a second direction that is opposite to the first direction.

Each of the first non-coating portion 124 and the second non-coating portion 125 serves as a passage for charging and discharging current. Since the first non-coating portion 124 and the second non-coating portion 125 extend directly to the outside over entire widths or entire lengths of the first electrode plate 121 and the second electrode plate 122, respectively (illustrated as a plurality in a cross-sectional shape), deformation (that is, reduction in roundness) or cracks of the electrode assembly 120 may be prevented, and it may also be advantageous for a high output of the battery. In addition, since the first non-coating portion 124 extends from the first electrode plate 121, the first non-coating portion 124 may be made of aluminum or an aluminum alloy, like the first electrode plate 121, and the second non-coating portion 125 may be made of copper, a copper alloy, nickel, or a nickel alloy, like the second electrode plate 122.

In addition, the first non-coating portion 124 of the electrode assembly 120 may be electrically connected (welded) to the first current collecting plate 130 to be described below, and the second non-coating portion 125 of the electrode assembly 120 may be electrically connected (welded) to the second non-coating portion 140 to be described below. Furthermore, the first current collecting plate 130 may be electrically connected (welded) to the cap assembly 160, and the second current collecting plate 140 may be electrically connected (welded) to the cylindrical can 110. Thus, the cap assembly 160 may act as a positive electrode, and the cylindrical can 110 may act as a negative electrode. Of course, the connection relationship is reversed so that the cap assembly 160 operates as a negative electrode, and the cylindrical can 110 operate as a positive electrode.

The first current collecting plate 130 may electrically connect the first non-coating portion 124 provided in the electrode assembly 120 to the cap assembly 160. The first current collecting plate 130 may have a substantially circular plate shape and may further include a recessed part 131 that presses the first non-coating portion 124 so as to be welded to the first non-coating portion 124. In addition, the first collecting plate 130 may further include a center through-hole through which a welding rod passes so that the second collecting plate 140 is resistance-welded to the bottom part 111 of the cylindrical can 110 and a peripheral through-hole so that the electrolyte is injected. The first current collecting plate 130 may be made of aluminum or an aluminum alloy. In some examples, the current collecting plate 130 may include or be referred to as a current collector or a conductor.

The first current collecting plate 130 may further include an insulating layer (e.g., polyimide, polypropylene, polyethylene, or metal oxide film, etc.) formed on a peripheral surface of the side part, which faces a side wall 112 of the cylindrical can 110. Substantially, the insulating layer prevents the first current collecting plate 130 from being electrically short-circuited with the sidewall 112 of the cylindrical can 110. Here, when the first current collecting plate 130 is made of an aluminum-based material, the above-described insulating layer may be an anodizing layer, i.e., an oxide film or an aluminum oxide layer ($Al_2O_3$). Although not limited thereto, a thickness of the insulating layer may be, for example, about 10 nm to about 100 nm.

The second current collecting plate 140 may electrically connect the second non-coating portion 125 provided in the electrode assembly 120 to the cylindrical can 110. The second current collecting plate 140 may have a substantially circular plate shape and may further include a recessed part 141 that presses the second non-coating portion 125 so as to be welded to the second non-coating portion 125. In addition, the second current collecting plate 140 may further include a protrusion 143 that is resistance-welded to the bottom part 111 of the cylindrical can 110 by a welding rod. In addition, the second current collecting plate 140 may further include an opening 144 through which a portion of the insulating plate 160 to be described below is coupled to pass. The second current collecting plate 140 may include copper, a copper alloy, nickel, or a nickel alloy. In some examples, the current collecting plate 140 may also include or be referred to as a current collector or a conductor.

The insulating plate 150 may be interposed between the second current collecting plate 140 and the bottom part 111 of the cylindrical can 110 to block unnecessary electrical contact between the second current collecting plate 140 and the bottom part 111. The insulating plate 150 may have a substantially circular plate shape and include a through-hole 161 formed so that the protrusion 143 of the second current collecting plate 140 passes to be welded to the bottom part 111 of the cylindrical can 110. In some examples, a partial area of the insulating plate 150, for example, an inner diameter surface of the through-hole 161 may be coupled to the opening 144 provided in the protrusion 143 of the second current collecting plate 140, and thus, the second current collecting plate 140 and the insulating plate 150 may be coupled to each other. The insulating plate 150 may include one kind or two or more kinds of materials selected from the group consisting of polypropylene (PP), polyethylene (PE), polyimide (PI), polybutyleneterephthalate (PBT), polycarbonate (PC), or polystyrene (PS). In some examples, the insulating plate 150 may include or be referred to as an insulator or dielectric.

The cap assembly 160 may include a cap-up 161, a safety vent 162, a cap-down 163, and an insulating ring 164. Here, the first current collecting plate 130 may be electrically connected to the cap-down 163 through an electrode tab 135. The safety vent 162 may be coupled to the cap-down 163, and the insulating ring 164 may be interposed between the cap-down 163 and an approximate circumference of the safety vent 162. A circumferential area of the safety vent 162 may be bent several times to wrap a circumference of the cap-up 161. As described above, the circumferential area of the safety vent 162 bent several times may be coupled to an upper area of the cylindrical can 110 through the insulating gasket 170. Each of the cap-up 161, the safety vent 162, the cap-down 163, and the electrode tab 135 may include aluminum or an aluminum alloy. The insulating ring 164 may include one kind or two or more kinds of materials selected from the group consisting of polypropylene (PP), polyethylene (PE), polyimide (PI), polybutyleneterephthalate (PBT), polycarbonate (PC), or polystyrene (PS).

The insulating gasket 170 may wrap the cap assembly 160 in a substantially circular ring shape to serve to electrically insulate the cap assembly 160 from the side part 111 of the cylindrical can 110. The insulating gasket 170 is substantially compressed between a beading portion 113, which is formed on the side portion of the cylindrical can 110, and the crimping part 114. Although not limited thereto, the insulating gasket 170 may include, for example, a heat-resistant resin. Although not limited thereto, the heat-resistant resin may include, for example, one kind or two or more kinds of materials selected from the group consisting of polypropylene (PP), polyethylene (PE), polyimide (PI), polybutyleneterephthalate (PET), polycarbonate (PC), or polystyrene (PS). In some examples, the insulating gasket 170 may include or be referred to as an insulator or dielectric.

Furthermore, the electrolyte (not shown in the drawing) may be injected inside the cylindrical can 110 to serve so that lithium ions generated by electrochemical reaction in the first electrode plate 121 and the second electrode plate 122 inside the battery during the charging and discharging are movable. The electrolyte may be a non-aqueous organic electrolyte that is a mixture of lithium salt and a high-purity organic solvent. Furthermore, the electrolyte may be a polymer using a polymer electrolyte or a solid electrolyte, and the type of the electrolyte is not limited here.

As described above, the present invention provides the secondary battery, in which the insulating plate 150 is coupled to the current collecting plate 140 to block leaking welding current when the current collecting plate 140 is welded to the can 110, thereby improving welding strength between the current collecting plate 140 and the can 100, improving welding strength distribution, and preventing damage between the current collecting plate 140 and the can 110 from occurring.

Figure 2A:
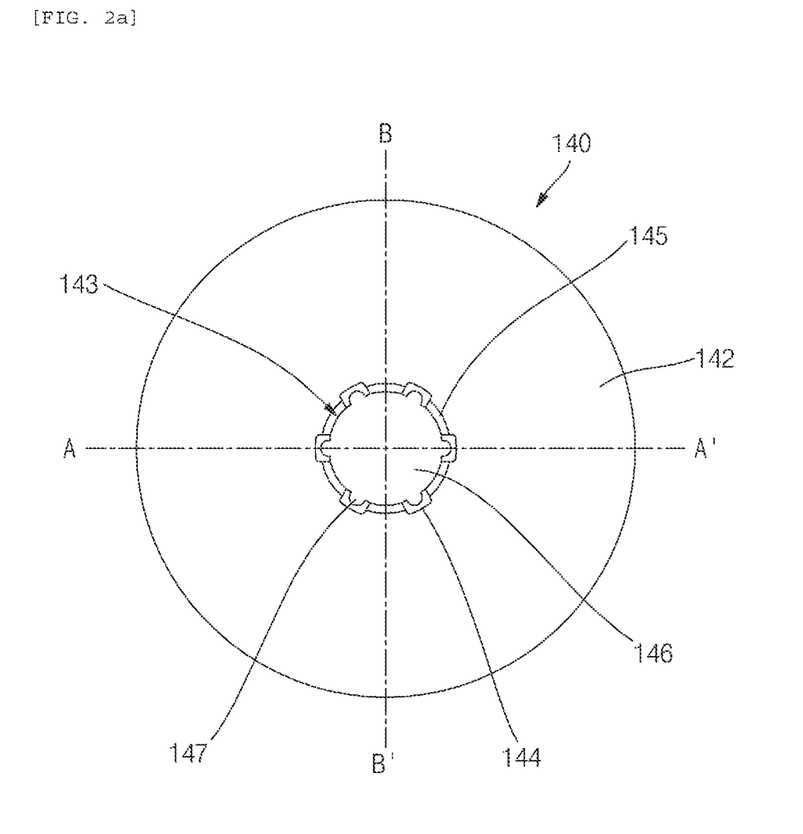
FIGS. 2a and 2b are plan and cross-sectional views illustrating an exemplary current collecting plate of the secondary battery.
Figure 2B:
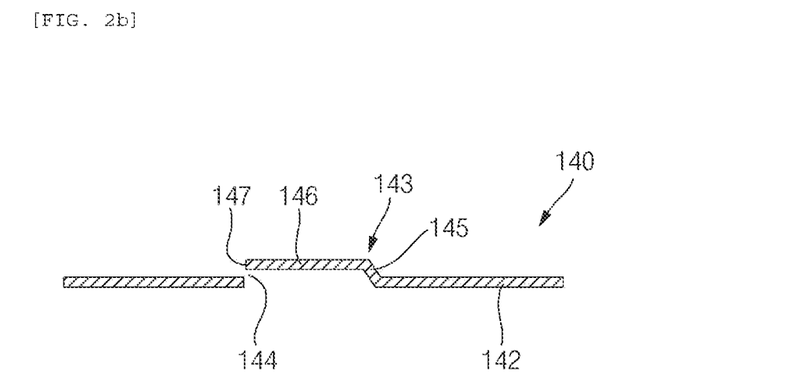

FIGS. 2a and 2b are plan and cross-sectional views illustrating an exemplary current collecting plate 140 of the secondary battery 100. Here, FIG. 2b is a cross-sectional view taken along line A-B of FIG. 2a. In addition, the current collecting plate 140 to be described below may be the above-described second current collecting plate or negative electrode current collecting plate.

In the example illustrated in FIGS. 2a and 2b, the current collecting plate 140 may include a current collecting flat portion 142 and a protrusion 143. The current collecting flat portion 142 may have a substantially circular plate shape and may include substantially flat top and bottom surfaces. The protrusion 143 may have a substantially cylindrical shape. The protrusion 143 may be formed at an approximate center of the current collecting flat portion 142 and may protrude from the current collecting flat portion 142 in one direction. The protrusion 143 may protrude, for example, toward the bottom part 111 of the cylindrical can 110.

The protrusion 143 may include an inclined surface 145 and a central flat portion 146. The inclined surface 145 may extend obliquely from the current collecting flat portion 142, and the central flat portion 146 may extend flatly from the inclined surface 145. The central flat portion 146 may be formed to be substantially flat on the bottom part 111 of the cylindrical can 110.

In some examples, an opening 144 may be formed in the protrusion 143. In some examples, the opening 144 may be formed in the inclined surface 145. Although six openings 144 are illustrated as being formed in the inclined surface 145 in the drawing, the number of openings 144 may be greater or less than six.

In some examples, the central flat portion 146 may include a side protrusion 147 that protrudes toward the opening 144. The side protrusion 147 may be formed on the same plane as the central flat portion 146, but may protrude from the central flat portion 146 in an outer lateral direction.

Figure 3A:
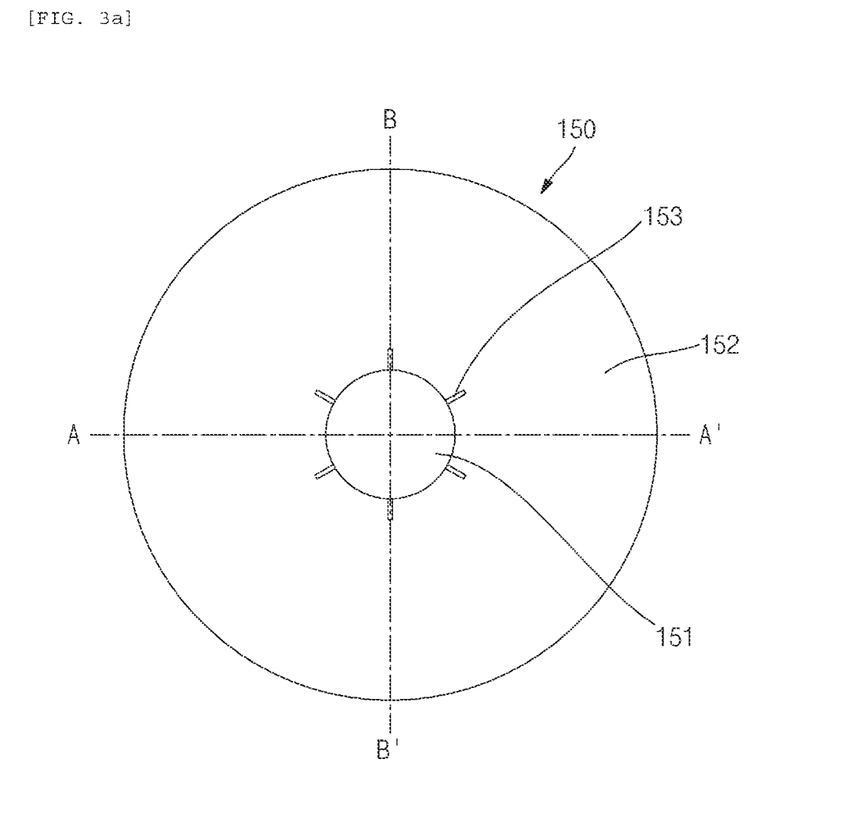
FIGS. 3a and 3b are plan and cross-sectional views illustrating an exemplary insulating plate coupled to the current collecting plate of the secondary battery.
Figure 3B:
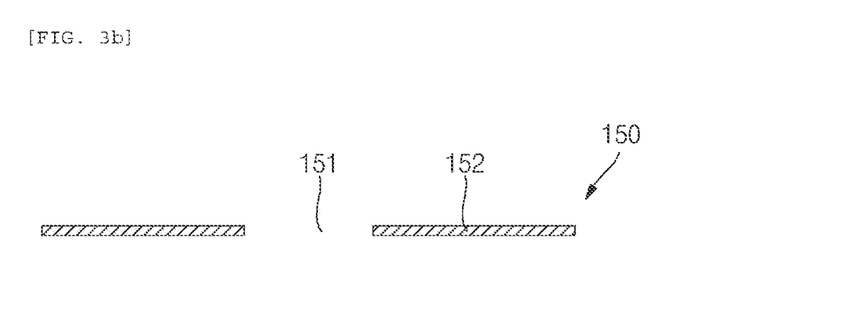

FIGS. 3a and 3b are plan and cross-sectional views illustrating an exemplary insulating plate 150 coupled to the current collecting plate 140 of the secondary battery 100. Here, FIG. 3b is a cross-sectional view taken along line A-B of FIG. 3a.

In the example illustrated in FIGS. 3a and 3b, the insulating plate 150 may include an insulating flat portion. 152 and a through-hole 151. The insulating flat portion 152 may have a substantially circular plate shape and may include substantially flat top and bottom surfaces. The through-hole 151 may be formed at an approximate center of the insulating flat portion 152, and an inner diameter of the through-hole 151 may be less than an outer diameter of the protrusion 143.

In some examples, the insulating plate 150 may include a plurality of slits 153 formed in a diameter direction from the through-hole 151. Here, each of the slits 153 may include or be referred to as a cutoff part or a cutting part. A length of the slit 153 is sufficient if the protrusion 143 of the current collecting plate 140 is coupled and fixed to the through-hole 151 of the insulating plate 150. In some examples, when the protrusion 143 of the current collecting plate 140 is coupled to the through-hole 151 of the insulating plate 150, an inner diameter surface of the through-hole 151 is bent so that the slit passes through and is coupled to the opening 144. In some examples, after the inner diameter surface of the through-hole 141 passes through and is coupled to the opening 144, the inner diameter surface may be flat as in its original state. Although six slits 153 are illustrated as being formed around the through-hole 151 in the insulating plate 150, the number of slits 153 may be greater or less than six.

Figure 4A:
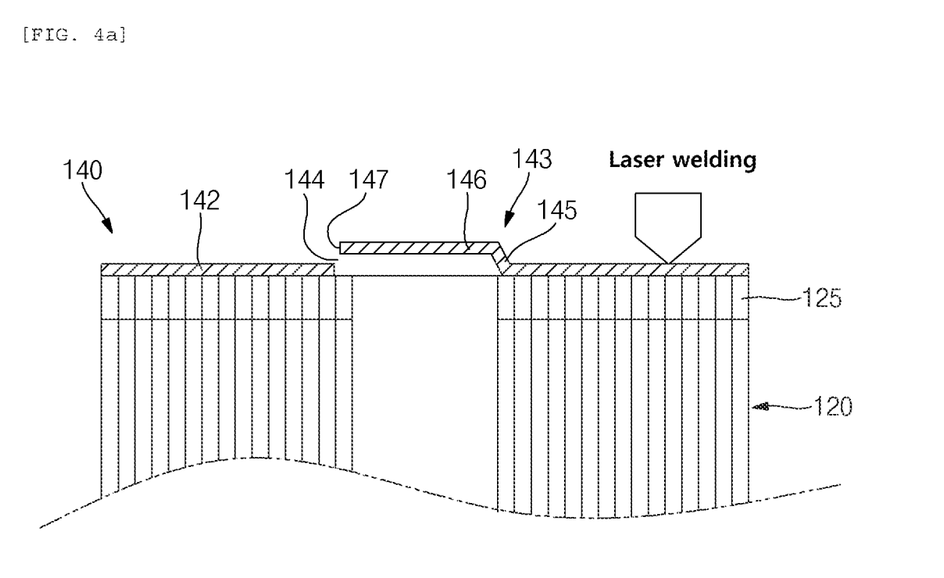
FIGS. 4a to 4d are schematic views illustrating partial processes in a process of manufacturing an exemplary secondary battery.

FIGS. 4a to 4d are schematic views illustrating partial processes in a process of manufacturing an exemplary secondary battery 100. FIG. 4a is a schematic view illustrating a state in which the current collecting plate 140 is seated on the electrode assembly 120 and then is laser-welded.

In the example illustrated in FIG. 4, after the current collecting plate 140 having the protrusion 143 and the opening 144 is seated on the non-coating portion 125 of the electrode assembly 120, a laser welding process may be performed. Thus, the flat current collecting portion 142 of the current collecting plate 140 may be laser-welded on the non-coating portion 125 of the electrode assembly 120.

Figure 4B:
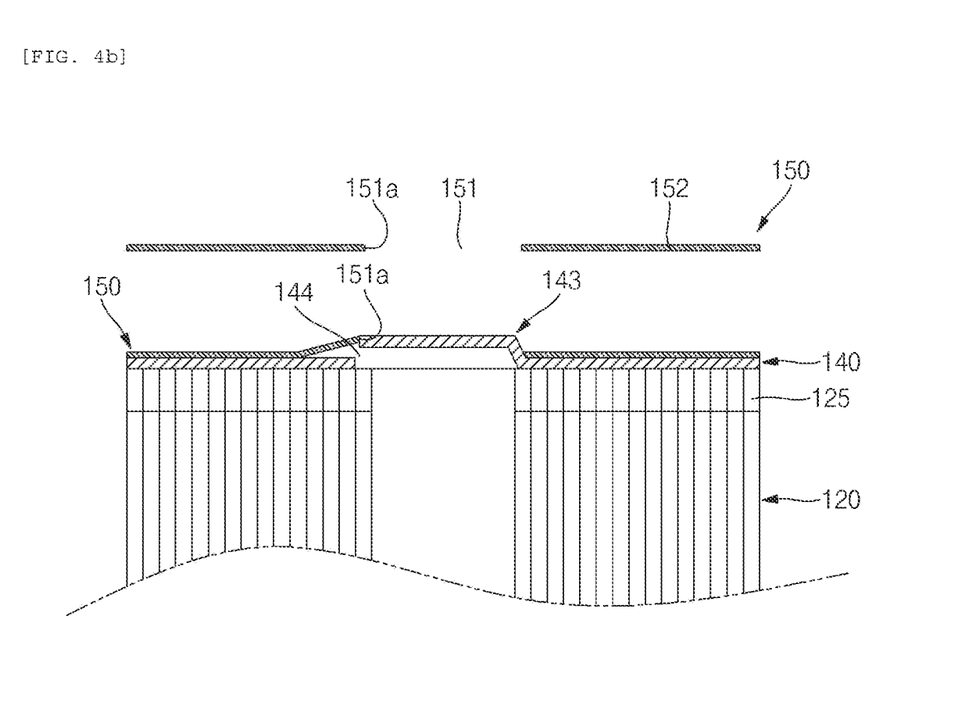

FIG. 4b is a schematic view illustrating a state in which the insulating plate 150 is coupled to the current collecting plate 140. In the example illustrated in FIG. 4b, the insulating plate 150 having the through-hole 151 is coupled to the current collecting plate 140. In some examples, the protrusion 143 of the current collecting plate 140 may be coupled to the through-hole 151 of the insulating plate 150. In addition, when an inner diameter surface 151a of the through-hole 151 passes through and is coupled to the opening 144 of the protrusion 143, the inner diameter surface 151a of the through-hole 151 may be bent by the slits 153.

Figure 4C:
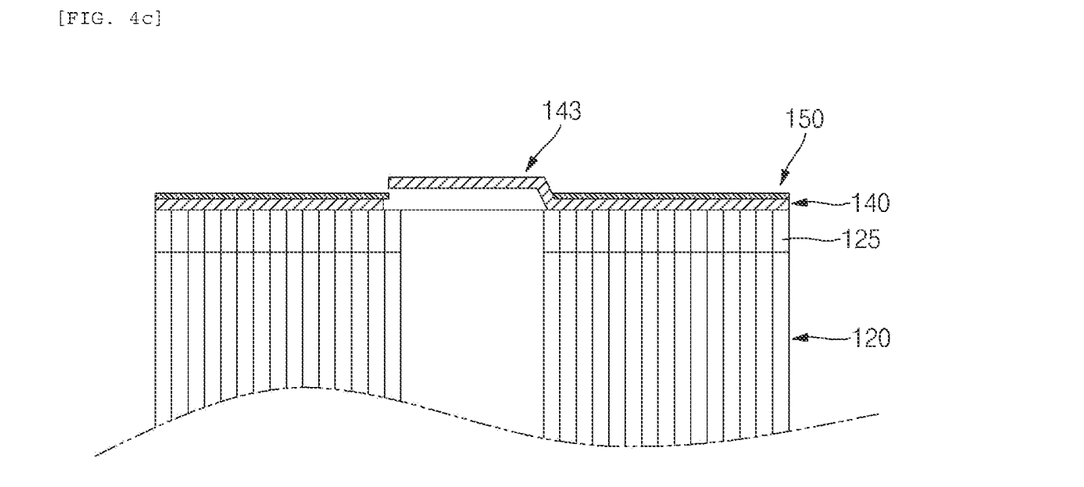

FIG. 4c is a schematic view illustrating a state after the insulating plate 150 is coupled to the current collecting plate 140. In the example illustrated in FIG. 4c, an insulating flat portion 152 of the insulating plate 150 may be in close contact with a current collecting flat portion 142 of the collecting plate 140, and the protrusion 143 of the current collecting plate 140 may be coupled to the through-hole 151 of the insulating date 150. In addition, since the inner diameter surface 151a of the through-hole 151 passes through and is coupled to the opening 144 of the protrusion 143, the insulating plate 150 is not separated from the current collecting plate 140 by external force during the process of manufacturing the secondary battery 100.

Figure 4D:
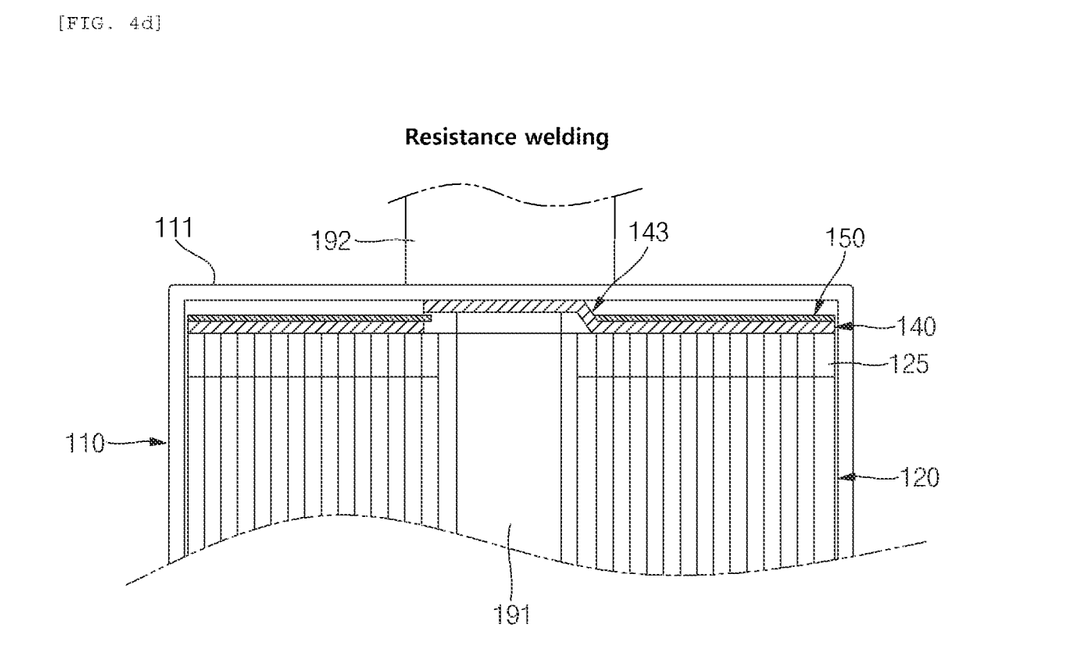

FIG. 4d is a schematic view illustrating a state in which the current collecting plate 140 is welded to the bottom part 111 of the cylindrical can 110. In the example illustrated in FIG. 4d, an inner welding rod 191 may pass through the electrode assembly 120 and be in close contact with the protrusion 143 of the current collecting plate 140, and an outer welding rod 192 may be in close contact with the bottom part 111 of the cylindrical can 110. In some examples, when the inner welding rod 191 applies a negative voltage, and the outer welding rod 192 applies a positive voltage, welding current flows between the inner welding rod 191 and the outer welding rod 192. In some examples, the welding current only flows between the protrusion 143 of the current collecting plate 140 and the bottom part 111 of the can 110, but does not flow in an outer region thereof. In some examples, since the insulating plate 150 is interposed outside the protrusion 143 of the current collecting plate 140, welding leakage current does not flow in a region corresponding to the insulating plate 150. Thus, since the welding current flows to be concentrated to only the protrusion 143 of the current collecting plate 140, the protrusion 143 of current collecting plate 140 is well welded to the bottom part 111 of the can 110. Thus, welding strength between the protrusion 143 of the current collector 140 and the bottom part 111 of the can 110 may be improved. Furthermore, welding strength distribution between the current collecting plate 140 and the can 110 for each secondary battery 100 may be also reduced, and damage of the current collecting plate 140 and the can 110 may be prevented.

Figure 5:
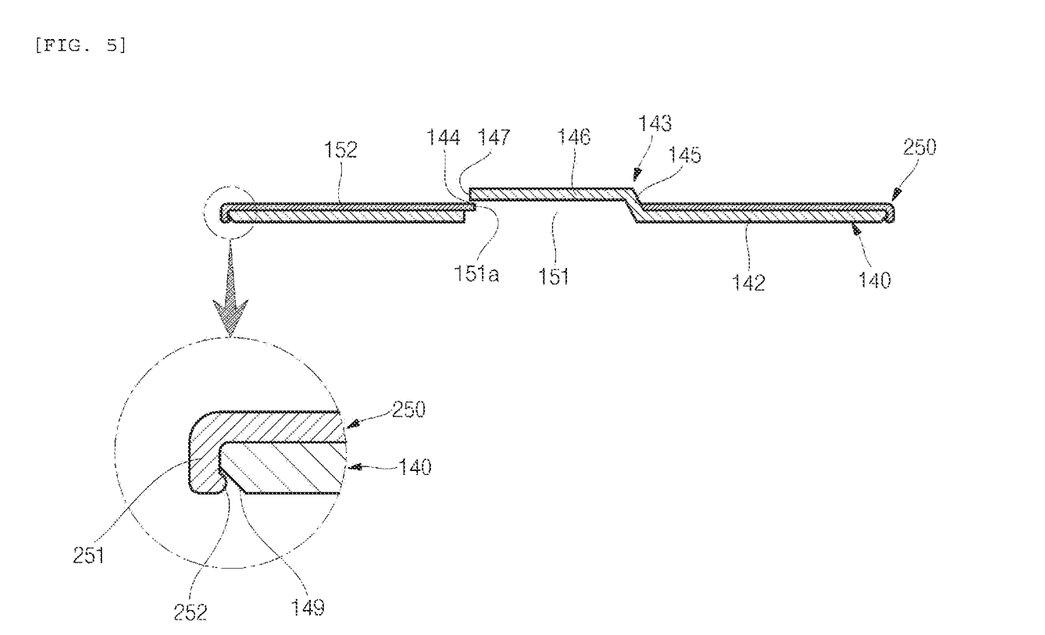
FIG. 5 is a cross-sectional view illustrating an exemplary current collecting plate and insulating plate of the secondary battery.

FIG. 5 is a cross-sectional view illustrating a current collecting plate 140 and an insulating plate 250 in a secondary battery according to another embodiment of the present invention. In the example illustrated in FIG. 5, an insulating plate 250 may be similar to the configuration of the insulating plate 150 described above except that the insulating plate 250 includes a circumferential portion 251 surrounding a circumference of a current collecting plate 140.

In the example illustrated in FIG. 5, the insulating plate 250 may further include a circumferential portion 251 surrounding a circumference of the current collecting plate 140 along the circumference of the insulating flat portion 152. The circumferential portion 251 may extend in a substantially vertical direction from the circumference of the insulating flat portion 152 and be in close contact with the circumference of the current collecting plate 140.

In some examples, the current collecting plate 140 may include a chamfered surface 149 formed on the circumference thereof, and the insulating plate 250 may further include a protrusion 253 that protrudes inward from the circumferential portion 251 so as to be proximity to or in close contact with the chamfered surface. Thus, since the insulating plate 250 is more stably coupled and fixed to the current collecting plate 140, the insulating plate 250 is not separated from the current collecting plate 140 during the process of manufacturing the secondary battery 100.

Figure 6A:
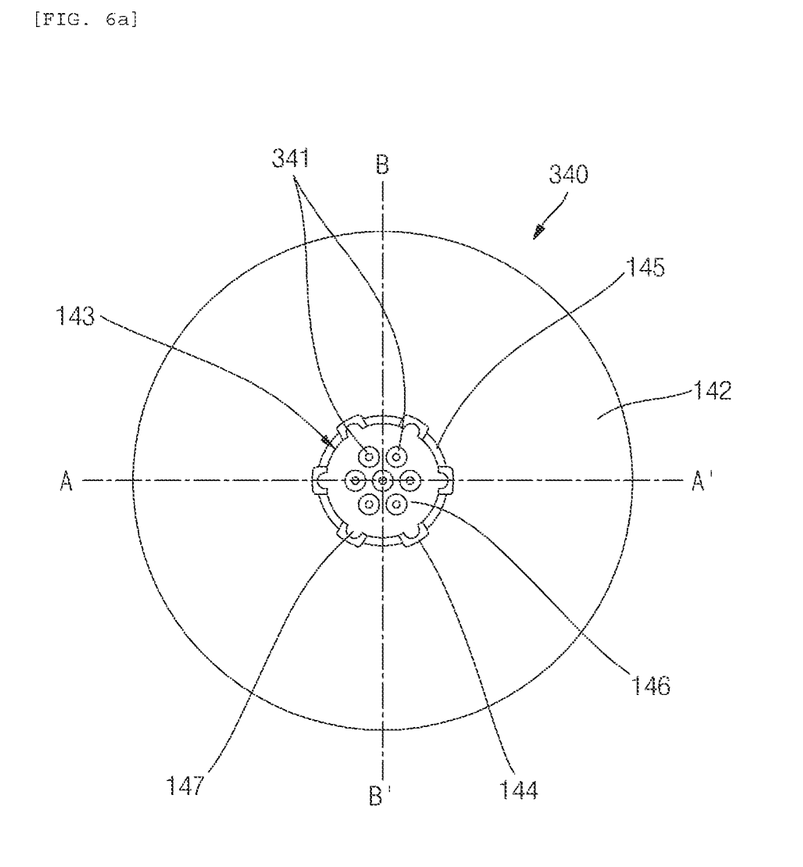
FIGS. 6a and 6b are cross-sectional views illustrating an exemplary current collecting plate of the secondary battery.
Figure 6B:
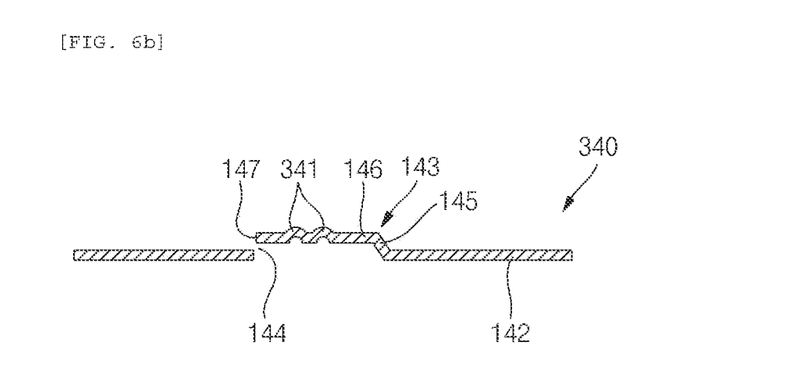

FIGS. 6a and 6b are cross-sectional views illustrating an exemplary current collecting plate 340 of the secondary battery 100. Here, FIG. 6b is a cross-sectional view taken along line A-B of FIG. 6a. In the example illustrated in FIGS. 6a and 6b, the current collecting plate 340 may be similar to the configuration of the current collecting plate 140 described above except that a plurality of embossments 341 are formed on the protrusion 143.

In the example illustrated in FIGS. 6 and 6b, the current collecting plate 340 may further include a plurality of embossments 341 formed in a central flat portion 146 of the protrusion 143. Each of the embossments 341 more increases contact resistance between the current collecting plate 140 and the bottom part 111 of the can 110 to further improve welding strength according to resistance welding. Although seven embossments 341 are formed at the central flat portion 146 in the drawing, the number of embossments 148 may be greater or less than seven.

The above-mentioned embodiment is merely an embodiment of the secondary battery, and thus, the present invention is not limited to the foregoing embodiment, and also it will be understood by those of ordinary skill in the art that various changes in form and details may be made therein without departing from the spirit and scope of the present invention as defined by the following claims.

The invention claimed is:

1. A secondary battery comprising:
   a cylindrical can having an opening;
   an electrode assembly which is accommodated in the opening of the cylindrical can and wound in a cylinder shape;
   a cap assembly which is electrically connected to the electrode assembly and seals the cylindrical can;
   a current collecting plate configured to electrically connect the electrode assembly to the cylindrical can; and
   an insulating plate interposed between the current collecting plate and the cylindrical can,
   wherein the current collecting plate comprises a current collecting flat portion that is electrically connected to the electrode assembly and a protrusion protruding from a center of the current collecting flat portion toward the cylindrical can, wherein the protrusion includes at least one opening, and
   the insulating plate comprises an insulating flat portion interposed between the current collecting flat portion and the cylindrical can and a through-hole having an inner diameter surface to which the opening of the protrusion is coupled.

2. The secondary battery of claim 1, wherein the protrusion comprises an inclined surface extending from the current collecting flat portion and a central flat portion extending from the inclined surface,
   wherein the opening is formed on the inclined surface.

3. The secondary battery of claim 2, wherein the central flat portion comprises a side protrusion protruding toward the opening.

4. The secondary battery of claim 2, wherein the central flat portion comprises a plurality of embossments welded to the cylindrical can.

5. The secondary battery of claim 1, wherein an inner diameter of the through-hole is less than an outer diameter of the protrusion.

6. The secondary battery of claim 1, wherein the insulating plate comprises at least one slit formed in a diameter direction from the through-hole.

7. The secondary battery of claim 1, wherein the insulating plate comprises a circumferential portion that wraps a circumference of the current collecting plate.

8. The secondary battery of claim 1, wherein the current collecting plate comprises copper or nickel, and
   the insulating plate comprises one kind or two or more kinds of materials selected from the group consisting of polypropylene (PP), polyethylene (PE), polyimide (PI), polybutyleneterephthalate (PBT), polycarbonate (PC), or polystyrene (PS).

* * * * *